(12) United States Patent
Hamada et al.

(10) Patent No.: US 9,272,868 B2
(45) Date of Patent: Mar. 1, 2016

(54) DOCUMENT READING DEVICE

(71) Applicants: Masataka Hamada, Fuefuki (JP); Junya Nakajima, Minamialps (JP); Seiji Nishizawa, Chuo (JP)

(72) Inventors: Masataka Hamada, Fuefuki (JP); Junya Nakajima, Minamialps (JP); Seiji Nishizawa, Chuo (JP)

(73) Assignees: XEROX CORPORATION, Norwalk, CT (US); NISCA CORPORATION, Minamikoma-gun, Yamanashi-ken (JP)

( * ) Notice: Subject to any disclaimer, the term of this patent is extended or adjusted under 35 U.S.C. 154(b) by 0 days.

(21) Appl. No.: 14/424,191

(22) PCT Filed: Aug. 23, 2013

(86) PCT No.: PCT/JP2013/072564
§ 371 (c)(1),
(2) Date: Feb. 26, 2015

(87) PCT Pub. No.: WO2014/034561
PCT Pub. Date: Mar. 6, 2014

(65) Prior Publication Data
US 2015/0203309 A1  Jul. 23, 2015

(30) Foreign Application Priority Data
Aug. 27, 2012 (JP) ................................ 2012-186056

(51) Int. Cl.
*B65H 7/20* (2006.01)
*G03G 15/00* (2006.01)
(Continued)

(52) U.S. Cl.
CPC .. *B65H 7/20* (2013.01); *B65H 1/04* (2013.01); *B65H 1/08* (2013.01); *B65H 3/06* (2013.01);
(Continued)

(58) Field of Classification Search
CPC .............. B65H 3/00; B65H 3/06; B65H 3/46; B65H 3/52; B65H 3/66; B65H 5/06; B65H 5/36; B65H 29/12; B65H 29/52; B65H 2801/03; B65H 2801/06; B65H 2801/39; B65H 7/20; B65H 29/14; B65H 1/08; B65H 1/04; B65H 29/58; B65H 5/068; B65H 29/125; B65H 31/00; B65H 5/38; G03G 15/00; G03G 21/16; G03G 15/602; H04N 1/04; H04N 1/00; H04N 1/00541; H04N 1/00543; H04N 1/00557
USPC ......... 271/3.14, 3.2, 4.01, 4.08, 4.1, 264, 241
See application file for complete search history.

(56) References Cited

U.S. PATENT DOCUMENTS 5,881,350 A * 3/1999 Wada ..................... G03G 15/60
                                                              271/3.14
6,027,109 A * 2/2000 Wada ..................... G03G 15/60
                                                              271/3.14
(Continued)

FOREIGN PATENT DOCUMENTS

| JP | 2002-182437 A | 6/2002 |
| JP | 2008-162775 A | 7/2008 |
| JP | 2013-058959 A | 3/2013 |

OTHER PUBLICATIONS

PCT, "International Search Report for International Application No. PCT/JP2013/072564".

*Primary Examiner* — David H Bollinger
(74) *Attorney, Agent, or Firm* — Manabu Kanesaka (57) ABSTRACT

A document reading device is capable of facilitating attachment/detachment of a reading unit provided inside a U-shaped document conveying path formed in a document conveying device. The document reading device includes a U-shaped document conveying path extending from a sheet supply tray to a sheet discharge tray through a reading section and a reading unit disposed inside the U-shaped document conveying path, a downstream part of the sheet supply tray on which a document is placed and a guide member provided upstream of the document conveying path to continue from the sheet supply tray and is arranged to be attachable/detachable with respect to the sheet supply tray or document conveying path. The reading unit is removable from inside the U-shaped document conveying path through an opening through which the downstream part of the sheet supply tray and guide member of the document conveying path are removed.

3 Claims, 6 Drawing Sheets (51) Int. Cl.

| | | |
|---|---|---|
| *H04N 1/00* | (2006.01) | |
| *B65H 5/38* | (2006.01) | |
| *G03G 21/16* | (2006.01) | |
| *H04N 1/04* | (2006.01) | |
| *B65H 1/04* | (2006.01) | |
| *B65H 1/08* | (2006.01) | |
| *B65H 3/06* | (2006.01) | |
| *B65H 5/06* | (2006.01) | |
| *B65H 29/12* | (2006.01) | |
| *B65H 29/14* | (2006.01) | |
| *B65H 29/58* | (2006.01) | |
| *B65H 31/00* | (2006.01) | |

(52) U.S. Cl.
 CPC .................. *B65H 5/068* (2013.01); *B65H 5/38* (2013.01); *B65H 29/125* (2013.01); *B65H 29/14* (2013.01); *B65H 29/58* (2013.01); *B65H 31/00* (2013.01); *G03G 15/00* (2013.01); *G03G 15/602* (2013.01); *G03G 21/16* (2013.01); *H04N 1/00* (2013.01); *H04N 1/00541* (2013.01); *H04N 1/00543* (2013.01); *H04N 1/00557* (2013.01); *H04N 1/04* (2013.01)

(56) References Cited

U.S. PATENT DOCUMENTS

| | | |
|---|---|---|
| 2007/0264062 A1 | 11/2007 | Jinza et al. |
| 2010/0252988 A1* | 10/2010 | Hagiyama ............ B65H 3/0684 271/4.1 |
| 2010/0295233 A1* | 11/2010 | Kano ..................... H04N 1/121 271/3.14 |
| 2011/0188101 A1 | 8/2011 | Tsujimura |
| 2012/0170087 A1* | 7/2012 | Nose ..................... B65H 3/5223 358/498 |

* cited by examiner

FIG. 6

DOCUMENT READING DEVICE

RELATED APPLICATIONS

The present application is National Phase of International Application No. PCT/JP2013/072564 filed Aug. 23, 2013, and claims priority from Japanese Application No. 2012-186056, filed Aug. 27, 2012, the disclosure of which is hereby incorporated by reference herein in its entirety.

TECHNICAL FIELD

The present invention relates to a document reading device that reads both sides of a document and, more particularly, to a document reading device provided with a document conveying device having a reading unit for reading one side of a document the other side of which has been read.

BACKGROUND ART

Conventionally, as a document reading device that reads a double-sided document with images formed on both sides thereof, there are known a device including a document conveying device having a reversing mechanism for reversing the document and configured to conveying the document to a reading section for reading one side of the document, reversing the document using the reversing mechanism, and conveying once again the document to the reading section for reading the other side of the document, and a device including two first and second reading sections for reading one side of the document and the other side thereof, respectively.

In document reading devices that read both sides of the document using such two reading sections, there is known a device having a configuration in which a first reading unit is provided at a document reading device main body side, and a second reading unit is provided inside a U-shaped document conveying path.

Normally, the document conveying device is configured to be openable/closable with respect to an upper surface of a document reading device main body so as to allow a document placed on a contact glass for book reading to be read. Accordingly, shock or vibration often occurs in the document conveying device every time the document conveying device is opened/closed. Thus, inevitably, the second reading unit provided on the document conveying device side needs to be subjected to maintenance at a higher frequency than the first reading unit provided on the document reading device main body.

In a device where the second reading unit as described above is provided inside the U-shaped document conveying path formed in the document conveying device, a conveying guide constituting the document conveying path surrounds the second reading unit, so that it is necessary to pull the second reading unit for removal in a direction (document width direction) perpendicular to a document conveying direction, i.e., to a front side of the device (refer to, for example, Patent Documents 1 and 2).

CITATION LIST

Patent Document

[Patent Document 1] Jpn. Pat. Appln. Laid-Open Publication 2002-182437
[Patent Document 2] Jpn. Pat. Appln. Laid-Open Publication 2008-162775

DISCLOSURE OF THE INVENTION

Problems to be Solved by the Invention

However, when the above configuration where the second reading unit is pulled to the front side of the document conveying device is adopted, it is necessary to form an opening for unit removal in a front-side side plate of the device, which may lead to significant reduction in strength of the device.

Further, when the second reading unit is attached to the document conveying device, the reading unit elongated in the document width direction is inserted from the device front side. Accordingly, an opening space is narrow, and a rear side cannot be seen, making it difficult to install and position the reading unit. In addition, removal of cables connecting a CCD substrate of the second reading unit and a control substrate of the device is troublesome.

In view of the above situation, an object of the present invention is to provide a document reading device capable of facilitating attachment/detachment of the reading unit provided inside the U-shaped document conveying path formed in the document conveying device and thereby of improving maintainability.

Means for Solving the Problems

To solve the above problem, according to the present invention, there is provided a document reading device including: a sheet supply tray on which a document is placed; a reading section that reads the document; a sheet discharge tray that houses the document read by the reading section; a U-shaped document conveying path that extends from the sheet supply tray to the sheet discharge tray through the reading unit; a separation section including a feeding roller that feeds the documents on the sheet supply tray while separating the document one from another and a separation member that is brought into pressure contact with the feeding roller; a document feeding roller pair that is disposed downstream of the separation section; and a reading unit that is disposed inside the U-shaped document conveying path, wherein a regulation wall that aligns leading ends of the documents placed on the sheet supply tray is provided downstream of the sheet supply tray, a guide member that constitutes the document conveying path extending at least over an area between the sheet supply tray and document feeding roller pair is provided so as to continue from the regulation wall, the guide member, and the separation member are configured as one separation guide unit, and the separation guide unit is configured to be detachably attached to the document conveying path, and the reading unit is configured to be removable from inside the U-shaped document conveying path through an opening of the document conveying path through which the separation guide unit is removed.

A box-shaped concave portion is formed in the separation guide unit, and the separation member is disposed in the box-shaped concave portion.

The separation guide unit has a lid portion that covers an opening portion of the box-shaped concave portion, and the lid portion is detachably or pivotally attached to the separation guide unit.

Advantages of the Invention

According to the document reading device of the present invention, it is possible to easily access the reading unit in the document conveying device without lowering strength of the device and to widely secure a taking-out space of the reading unit, thereby facilitating attachment/detachment of the reading unit and improving maintainability.

BEST MODE FOR CARRYING OUT THE INVENTION

Figure 1:
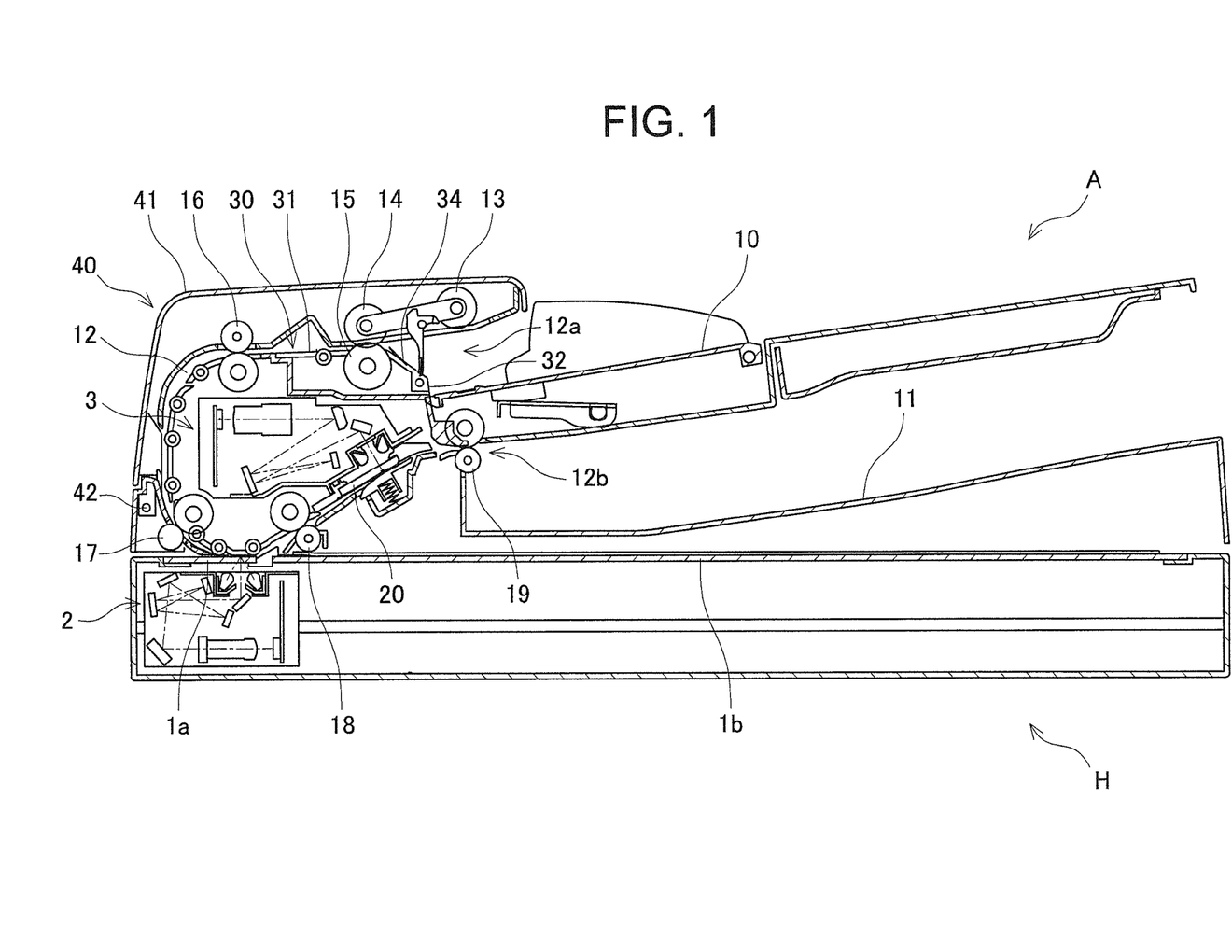
FIG. 1 is a cross-sectional view illustrating an entire configuration of a document reading device according to the present invention including a document reading device main body and a document conveying device.

A document reading device according to the present invention provided with a document conveying device will be described below. FIG. 1 is a cross-sectional view illustrating an entire configuration of a document reading device including a document reading device main body and a document conveying device.

As illustrated in FIG. 1, a document reading device includes a document reading device main body H and a document conveying device A that conveys a document. The document conveying device A is mounted to the document reading device main body H through a not illustrated hinge. The document conveying device A is supported by the hinge so as to be openable/closable with respect to an upper surface of the document reading device main body H.

The document reading device main body H incorporates a first reading unit 2 for reading one side of a document conveyed on an upper surface of a contact glass 1a by the document conveying device A. The document conveying device A incorporates a second reading unit 3 (reading unit) for reading the other side of the document that has passed through the upper surface of the contact glass 1a of the main body H.

The document conveying device A is openably/closably mounted to the document reading device main body H so as to expose an upper surface of the main body H and is configured to read the document placed on a contact glass 1b of the main body H while moving the first reading unit 2.

The first reading unit 2 incorporated in the document reading device main body H integrally includes a photoelectric conversion means including a light source, a plurality of mirrors, a lens, and a photoelectric conversion element (CCD). The first reading unit 2 irradiates a conveyed document through the first contact glass 1a with light from the light source. Light reflected from the document is reflected by the mirrors and then enters the photoelectric conversion means including the CCD through the lens, where the light is subjected to photoelectric conversion for document image reading. Further, the first reading unit 2 moves in a sub-scanning direction to thereby read an image of a thick document such as a book placed on the second contact glass 1b through opening/closing operation of the document conveying device A.

As illustrated in FIG. 1, the document conveying device A has a sheet supply tray 10 on which a plurality of documents can be placed and a sheet discharge tray 11 that houses the read document. The sheet supply tray 10 is disposed above the sheet discharge tray 11 in an overlapping manner. A regulation wall 32 that aligns leading ends of the documents placed on the sheet supply tray 10 is provided downstream of the sheet supply tray 10 so as to connect the sheet supply tray 10 and a U-shaped document conveying path 12 to be described later.

The document conveying path 12 is a U-shaped path extending from the sheet supply tray 10 up to the sheet discharge tray 11. The document conveying path 12 includes, as illustrated in FIG. 1, an upstream side path extending from a sheet supply port 12a through which the document on the sheet supply tray 10 is delivered up to a resist roller pair 16, a curved intermediate path extending, while curving, from the resist roller pair 16 to the first contact glass 1a, and a downstream side path extending from the first contact glass 1a up to a sheet discharge port 12b at which a discharge roller pair 19 is disposed.

Figure 3:
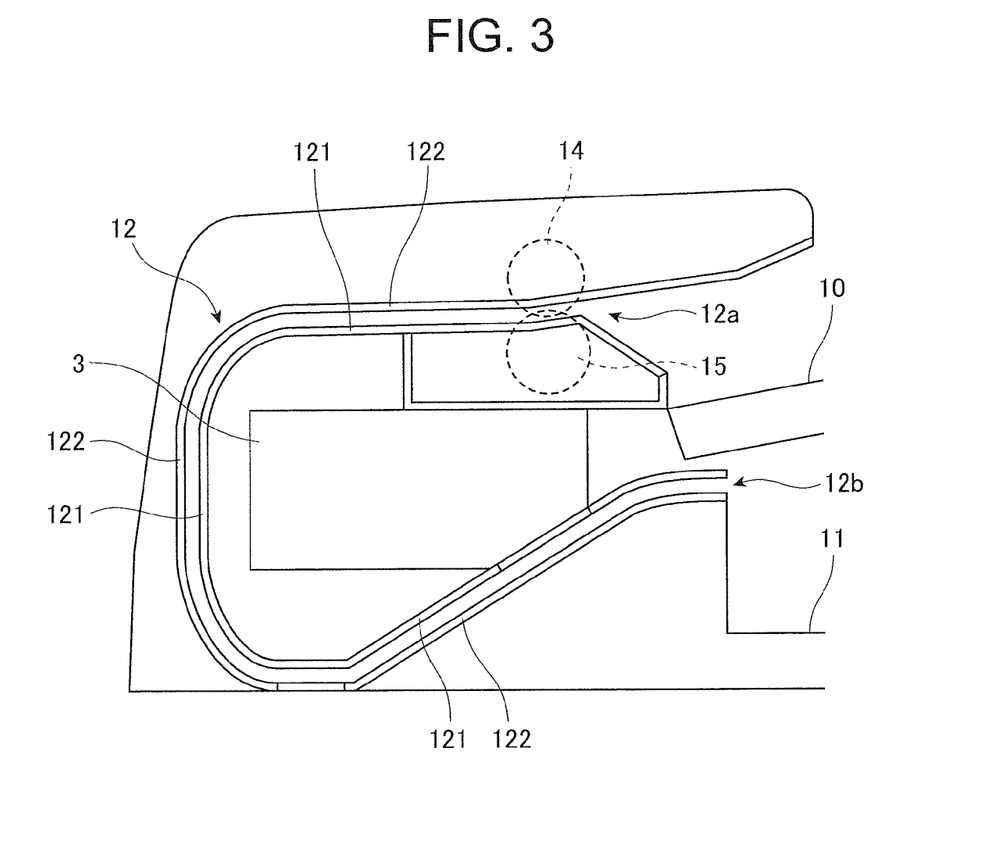
FIG. 3 is an exemplary view schematically illustrating the document conveying path of the document conveying device according to the present invention.

FIG. 3 schematically illustrates the document conveying path 12. As illustrated in FIG. 3, the document conveying path 12 is formed by a conveying guide member arranged on upper and lower sides thereof so as to guide the document. The guide member includes an inner guide 121 positioned inside the U-shape and an outer guide 122 positioned outside the U-shape.

Along the document conveying path 12, there are provided a delivery roller 13 that abuts against the document placed on the sheet supply tray 10 with its leading end aligned by the regulation wall 32 and thereby delivers the document, a feeding roller 14 that feeds the document delivered by the delivery roller 13, a separation roller (separation member) 15 that is brought into pressure contact with the feeding roller 14 so as to feed the document one by one, a resist roller pair (document feeding roller pair) 16 including resist rollers 16A and 16B (see FIG. 2) that receives an abutment of the leading end of the document fed by the feeding roller 14 and the separation roller 15 for alignment and then feeds the document downstream, a first conveying roller pair 17 disposed upstream of the first contact glass 1a, a second conveying roller pair 18 disposed downstream of the first contact glass 1a, and a discharge roller pair 19 disposed downstream of the second conveying roller pair 18 which discharges the document to the sheet discharge tray 11.

The delivery roller 13, the feeding roller 14, and the resist roller 16A are unitized with a sheet feed cover 41 of the document conveying device A to constitute a sheet feed cover unit 40. Further, the separation roller 15, the inner guide 121 (guide surface 31) and the regulation wall 32 of the sheet supply tray 10 are unitized to constitute a separation guide unit 30. Details of the sheet feed cover unit 40 and the separation guide unit 30 will be described later.

The document conveying device A incorporates the second reading unit 3 that reads a side of the document opposite to a side thereof read by the first reading unit 2. The second reading unit 3 is disposed inside the U-shaped document conveying path 12. The second reading unit 3 has a third contact glass 20 at its end portion in a sheet discharge direction. The third contact glass 20 is disposed between the second conveying roller pair 18 and the discharge roller pair 19. The third contact glass 20 functions as a part of the conveying guide member (inner guide 121) of the document conveying path 12. With this configuration, the second reading unit 3 reads the document passing through the surface of the third contact glass 20.

In the configuration described above, the document on the sheet supply tray 10 is delivered by the delivery roller 13 and fed one by one by the separation means (feeding roller 14 and separation roller 15). The fed one document is aligned by the resist roller pair 16 and conveyed to the first contact glass 1a by the conveying roller pair 17. Thereafter, the document that has passed through the first contact glass 1a is conveyed to the third contact glass 20 by the second conveying roller pair 18 and discharged to the sheet discharge tray 11 by the discharge roller pair 19. In this conveyance process, a front surface of the document is read by the first reading unit 2 when the document passes through the first contact glass 1a, and a rear surface of the document is read by the second reading unit 3 when the document passes through the third contact glass 20.

Figure 2:
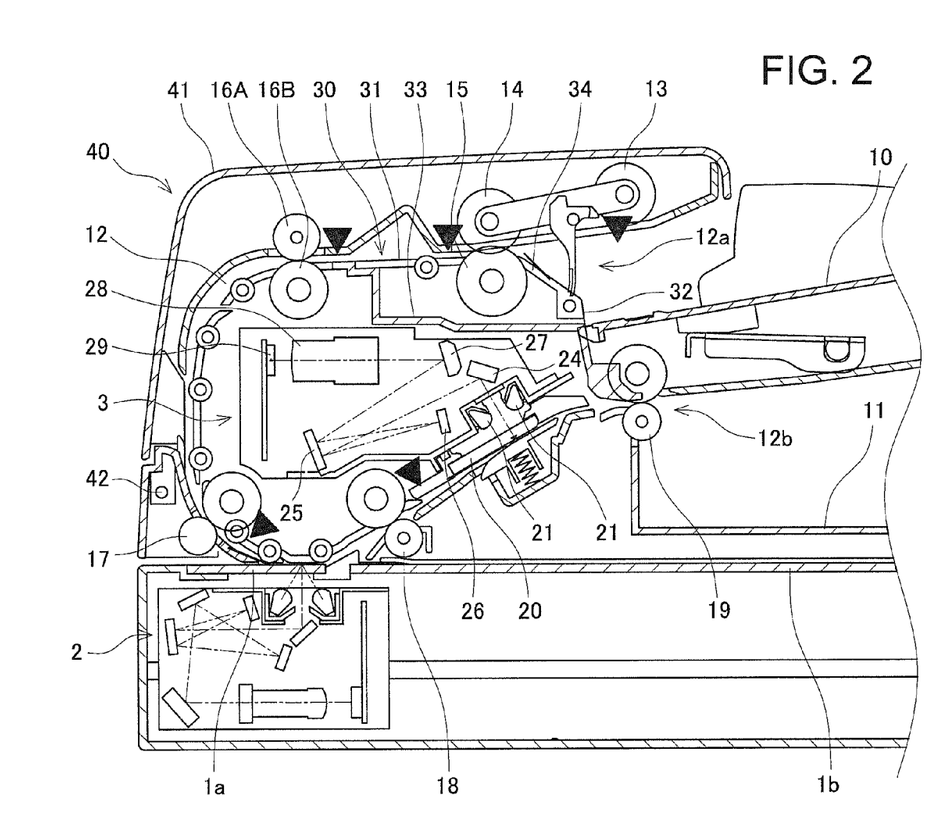
FIG. 2 is an enlarged cross-sectional view illustrating an area surrounding a document conveying path and a second reading unit of the document conveying device according to the present invention.

The following describes a configuration of a reading section in the second reading unit 3. FIG. 2 is an enlarged cross-sectional view illustrating an area surrounding the document conveying path 12 and the second reading unit 3. The second reading unit 3 includes a light source 21 having an LED for irradiating the document passing through the contact glass 20 with light and a light guide body, a plurality of mirrors 24, 25, 26, and 27 that lead reflected light from the document in a predetermined direction, a lens 28 that converges the reflected light led by the plurality of mirrors 24, 25, 26, and 27, and a CCD (photoelectric conversion element) 29 that photoelectric-converts the light converged by the lens 28.

The second reading unit 3 irradiates the document through the third contact glass 20 with light emitted from the light source 21. Light reflected from the document is reflected by the mirrors 24, 25, 26, and 27 and then enters the CCD through the lens 28, where the light is subjected to photoelectric conversion for document image reading.

As described above, in the above document reading device, the first reading unit 2 reads an image on the front surface of the document that passes through the first contact glass 1a, and the second reading unit 3 reads an image on the rear surface of the document that passes through the third contact glass 20, whereby a time required to read images on a double-sided document can significantly be reduced.

Figure 4:
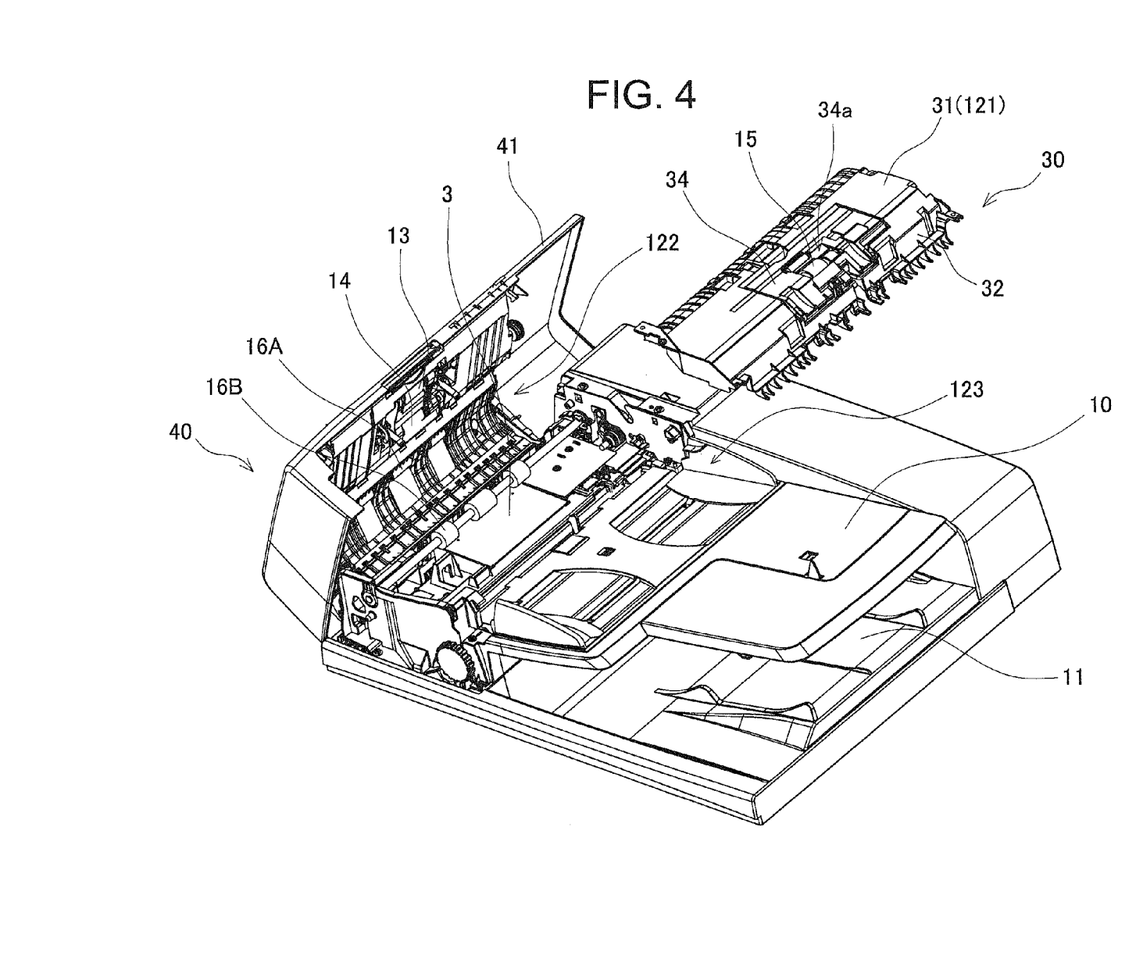
FIG. 4 is a perspective view illustrating a state where a separation guide unit is removed with a sheet feed cover unit of the document conveying device according to the present invention opened.
Figure 5:
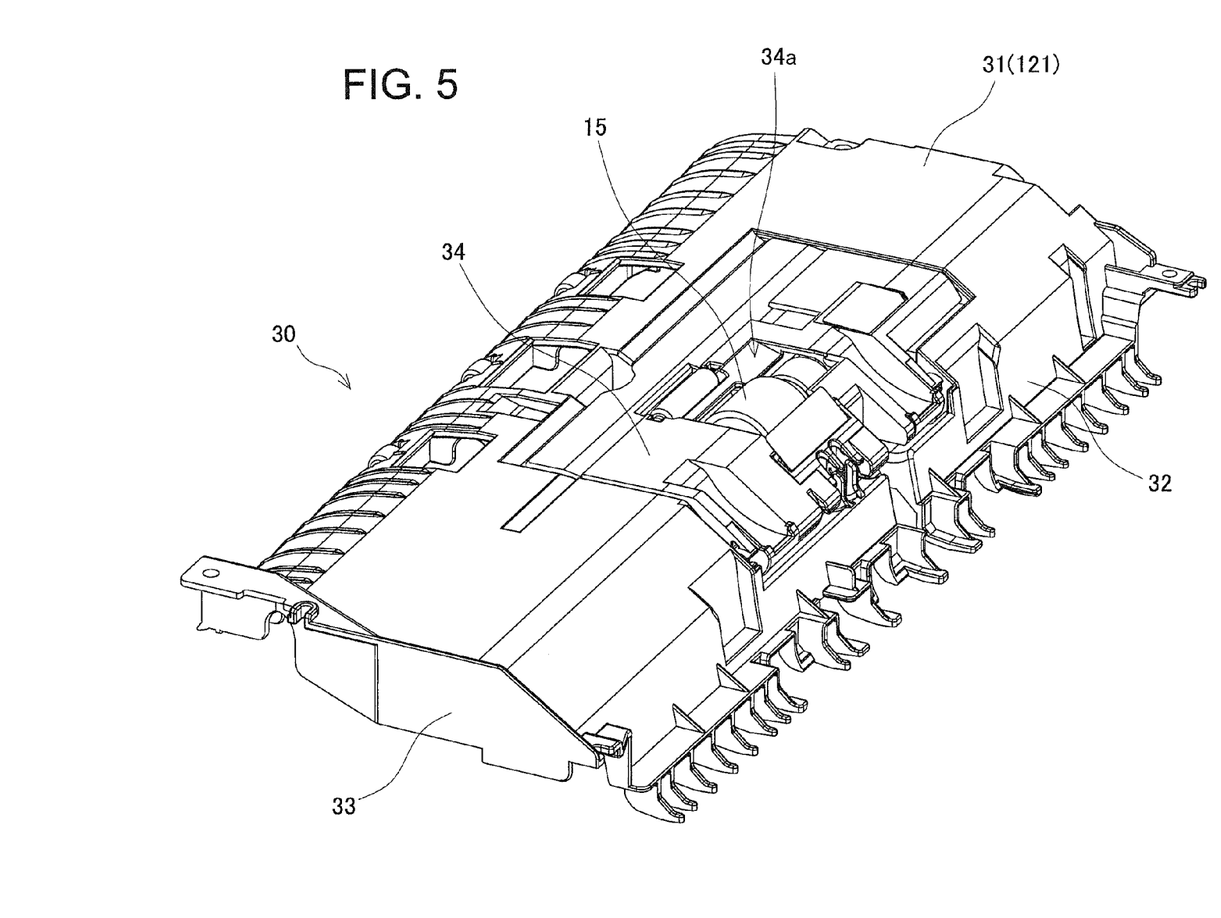
FIG. 5 is a perspective view illustrating the separation guide unit (state where a lid portion is closed) of the document conveying device according to the present invention.
Figure 6:
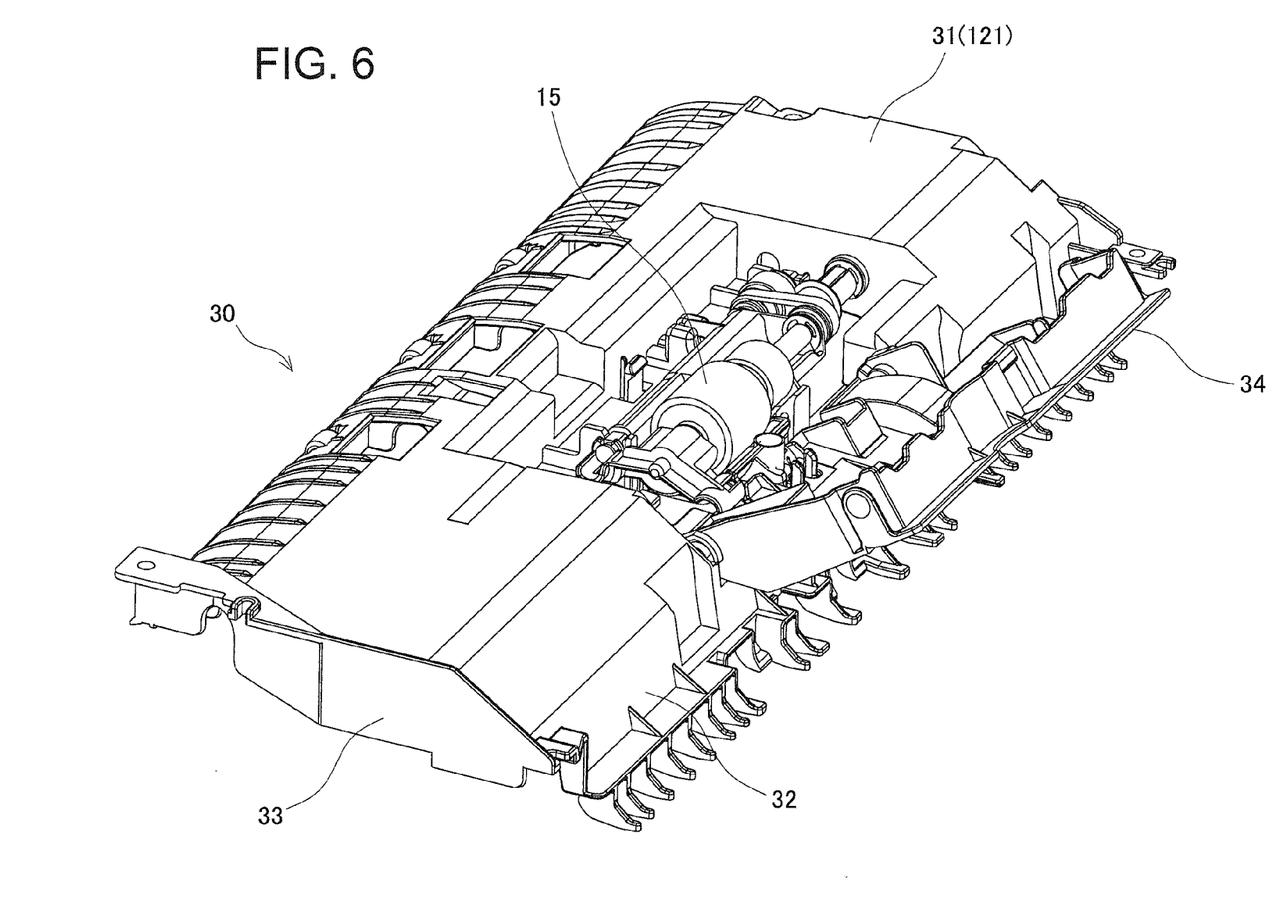
FIG. 6 is a perspective view illustrating the separation guide unit (state where the lid portion is opened) of the document conveying device according to the present invention.

The following describes details of the sheet feed cover unit 40 and the separation guide unit 30. FIG. 4 is a perspective view illustrating a state where the separation guide unit 30 is removed with the sheet feed cover unit 40 opened. FIGS. 5 and 6 are perspective views of the separation guide unit 30. FIG. 5 illustrates a state where a lid portion of the separation guide unit 30 is closed, and FIG. 6 illustrates a state where the lid portion is opened.

As illustrated in FIGS. 2 and 4, the document conveying device A is provided with the sheet feed cover 41 that covers the sheet supply port 12a, the document conveying path 12, the second reading unit 3, and the like. The sheet feed cover 41 is formed integrally with the delivery roller 13, the feeding roller 14, the resist roller 16A, and outer guide at an upstream to intermediate part of the document conveying path 12 to thereby constitute the sheet feed cover unit 40. The sheet feed cover unit 40 is pivotally supported with a pivotal pin 42, and it is possible to expose the upstream side of the document conveying path 12 by pivoting upward the sheet feed cover unit 40 as illustrated in FIG. 4.

On the other hand, inside the sheet feed cover unit 40, the separation guide unit 30 having inside thereof the separation roller 15 is provided. The separation guide unit 30 is detachably disposed in an opening portion 123 of the document conveying device A, formed at an upper portion of the second reading unit 3. Normally, the separation guide unit 30 is set in the opening portion 123 (see FIG. 4) and is fixed from above to a device side plate by screws (not illustrated).

As illustrated in FIG. 2, an outer surface of the separation guide unit 30 on the sheet supply port 12a side functions as the regulation wall 32 for aligning the leading ends of the documents placed on the sheet supply tray 10. Further, an upper surface of the separation guide unit 30 constitutes the inner guide 121 (guide surface 31) at the upstream side of the document conveying path 12. The guide surface 31 is formed at least over an area between the sheet supply tray 10 and the resist roller pair 16, as illustrated in FIG. 2.

Thus, the inner guide 121 extending from the sheet supply tray 10 to the resist roller pair 16 can be removed together with the separation guide unit 30, whereby the opening portion 123 to access the second reading unit 3 can be secured widely.

When the second reading unit 3 is removed for maintenance, the sheet feed cover unit 40 is pivoted about the pivotal pin 42 to expose the document conveying path 12, as illustrated in FIG. 4. Subsequently, the separation guide unit 30 is removed from the exposed document conveying path 12. Then, the second reading unit 3 is pulled for removal through the opening portion 123 through which the separation guide unit 30 is removed for maintenance.

As illustrated in FIG. 4, in the present embodiment, the resist roller 16B is positioned above the reading unit 3 in a state where the separation guide unit 30 is removed. Thus, by removing a shaft side of the resist roller 16B from the side plate upon removal of the reading unit and slightly moving one side of the removed resist roller 16B in a document feeding direction, it is possible to remove the reading unit 3 more easily. Alternatively, the resist roller 16B may be mounted to the inner guide 121. In this case, after the resist roller 16B is removed together with the separation guide unit 30 as one body, the reading unit 3 is removed. This further facilitates removal of the reading unit 3.

The separation guide unit 30 includes a box-shaped concave portion 33 having a side portion and a bottom portion with a space for mounting the separation roller 15 and its drive shaft provided thereinside and a lid portion 34 that covers an upper opening of the box-shaped concave portion 33. As illustrated in FIG. 6, the lid portion 34 is pivotally supported by the concave portion 33 and can thus open/close the concave portion 33. An upper surface of the lid portion 34 constitutes, together with the upper surface of the separation guide unit 30, the guide surface 31. Further, the lid portion 34 has an opening 34a for exposing the separation roller 15 disposed in the concave portion 33, and the separation roller 15 is brought into pressure contact with the feeding roller 14 disposed on the sheet feed cover unit 40 side through the opening 34a.

As described above, in the document conveying device A according to the present invention, the separation guide unit 30 is constituted by the box-shaped concave portion 33 and the lid portion 34 and thereby isolating the second reading unit 3 from the separation means including the feeding roller 14 and the separation roller 15. This prevents paper powder or roller shavings generated when the documents are separated one from another by the separation means from falling to the reading unit 3. The paper powder or roller shavings generated in association with the separation of the documents are accumulated in the concave portion 33 of the separation guide unit 30 and thus can be easily removed by opening the lid portion 34 at maintenance time of the separation guide unit 30.

Although the concave portion 33 of the separation guide unit 30 is pivotally supported by the lid portion 34 in the above example, the lid portion 34 may be detachably attached to the concave portion 33.

As described above in detail, according to the document reading device of the present invention, it is possible to easily access the reading unit in the document conveying device without lowering strength of the device and to widely secure a taking-out space of the reading unit, thereby facilitating attachment/detachment of the reading unit and improving maintainability.

REFERENCE SIGNS LIST

A: Document conveying device
H: Document reading device main body
3: Second reading unit (reading unit)
10: Sheet supply tray
11: Sheet discharge tray
12: Document conveying path
123: Opening portion
14: Feeding roller
15: Separation roller (separation member)
16: Resist roller pair (document feeding roller pair)
30: Separation guide unit
31: Guide surface
32: Regulation wall
33: Box-shaped concave portion
34: Lid portion

The invention claimed is:

1. A document reading device characterized by comprising:
   a sheet supply tray on which a document is placed;
   a reading section that reads the document;
   a sheet discharge tray that houses the document read by the reading section;
   a U-shaped document conveying path that extends from the sheet supply tray to the sheet discharge tray through the reading unit;
   a separation section including a feeding roller that feeds the documents on the sheet supply tray while separating the document one from another and a separation member that is brought into pressure contact with the feeding roller;
   a document feeding roller pair that is disposed downstream of the separation section; and
   a reading unit that is disposed inside the U-shaped document conveying path, wherein
   a regulation wall that aligns leading ends of the documents placed on the sheet supply tray is provided downstream of the sheet supply tray,
   a guide member that constitutes the document conveying path extending at least over an area between the sheet supply tray and the document feeding roller pair is provided so as to continue from the regulation wall,
   the regulation wall, the guide member, and the separation member are configured as one separation guide unit, and the separation guide unit is configured to be detachably attached to the document conveying path, and
   the reading unit is configured to be removable from inside the U-shaped document conveying path through an opening of the document conveying path through which the separation guide unit is removed.

2. The document reading device according to claim 1, characterized in that
   a box-shaped concave portion is formed in the separation guide unit, and
   the separation member is disposed in the box-shaped concave portion.

3. The document reading device according to claim 2, characterized in that
   the separation guide unit has a lid portion that covers an opening portion of the box-shaped concave portion, and
   the lid portion is detachably or pivotally attached to the separation guide unit.

* * * * *